United States Patent [19]

Won

[11] Patent Number: 5,400,157
[45] Date of Patent: Mar. 21, 1995

[54] COLOR FILTER SUBSTRATE FOR A LIQUID CRYSTAL DISPLAY WITH TERMINAL PORTIONS HAVING SAME HEIGHT AND SAME MATERIAL AS THOSE OF BLACK MATRIXES

[75] Inventor: Min-young Won, Kyunggi-do, Rep. of Korea

[73] Assignee: Samsung Display Device Co., Ltd., Kyunggi-do, Rep. of Korea

[21] Appl. No.: 154,627

[22] Filed: Nov. 17, 1993

[30] Foreign Application Priority Data

Feb. 5, 1993 [KR] Rep. of Korea ............. 93-1564

[51] Int. Cl.⁶ ........................... G02F 1/133
[52] U.S. Cl. .................. 359/67; 359/68; 359/87
[58] Field of Search ............. 359/67, 68, 74, 79, 359/87, 88, 885, 891, 892; 428/1; 430/7

[56] References Cited

U.S. PATENT DOCUMENTS

| | | | |
|---|---|---|---|
| 4,810,061 | 3/1989 | Nakanowatari et al. | 359/67 |
| 4,824,213 | 4/1989 | Morokawa | 359/67 |
| 4,853,296 | 8/1989 | Fukuyoshi | 359/68 |
| 4,935,757 | 6/1990 | Hatano et al. | 359/87 |
| 5,045,418 | 9/1991 | Fukuyoshi | 359/68 |
| 5,083,853 | 1/1992 | Ueki et al. | 359/54 |
| 5,194,976 | 3/1993 | Nakano et al. | 359/68 |
| 5,206,750 | 4/1993 | Aizawa et al. | 359/68 |
| 5,278,009 | 1/1994 | Iida et al. | 359/68 |
| 5,282,070 | 1/1994 | Nishida et al. | 359/68 |

*Primary Examiner*—William L. Sikes
*Assistant Examiner*—Tai V. Duong
*Attorney, Agent, or Firm*—Christie, Parker & Hale

[57] ABSTRACT

A color filter substrate for a liquid crystal display LCD of which a bad adhesion in a pattern terminal is reduced and an electrode pattern can be easily distinguished, is disclosed. Black matrixes and an indium tin oxide are formed on a glass substrate by using chromium and color filter layers having red, green and blue dyes are formed. A protective film and an ITO transparent electrode layer are deposited on the black matrix and the colors filter layers to be overlapped on a part of each pattern terminal. Thus, a liquid crystal display element can be realized such that the adhesive strength of the ITO can be improved. Also, as the pattern terminal has chromium, a tape automated bonding integrated circuit can be advantageously distinguished at the following process step of mounting it, making the automation of process possible and improving the productivity.

2 Claims, 1 Drawing Sheet

COLOR FILTER SUBSTRATE FOR A LIQUID CRYSTAL DISPLAY WITH TERMINAL PORTIONS HAVING SAME HEIGHT AND SAME MATERIAL AS THOSE OF BLACK MATRIXES

BACKGROUND OF THE INVENTION

1. Field of the Invention

The present invention relates to a liquid crystal display LCD and, particularly to a color filter substrate for a liquid crystal display such that, not only an indium tin oxide ITO pattern terminal is also formed at the same time when a black matrix is formed by the use of chromium, improving the adhesive strength of the ITO transparent electrode but also a tape automated bonding drive integrated circuit TAB drive IC can be advantageously distinguished at a following process step of mounting it, making the automation of process possible and improving the productivity.

2. Description of the Art

Recently, according as the spread of an office automated machine or a potable small size television, studies on liquid crystal display LCD, electroluminescence EL element, plasma display panel PDP, light emitting diode LED, vacuum fluorescent display VED and the like have vigorously carried out and a part of them is under utilization.

Among them, the LCD has a thin thickness, a low weight and is low in price. This display has a good match for the integrated circuit, driven by the less consumption of voltage. So, the liquid crystal display has been widely used as an alternative to cathode ray tubes in display monitors for vehicles or in a screen of color televisions as well as in display monitors for lap top personal computers or pocket computers.

Also, as a color filter used in the LCD, 3–5 inch has been in practice. 10–14 inch is under development. Further color filter size is on the rapid trend of enlargement.

Like a color cathode ray tube CRT, a color filter is a technology of realizing colors such that a base unit of picture element consists of three primary colors of the light and the intensity of the three colors is modulated, namely the intensity of the passing light being modulated.

The color characteristic is most advantageous in the active matrix liquid crystal panel having the contrast ratio of 40:1. However, compared with the manufacture of a monochro liquid crystal, the manufacture of the color liquid crystal has disadvantages of the increased picture elements (three times), the increased marginal integrated circuits (driver etc), the cost increase and the low yield.

As a conventional method of forming the color filter layer, there are a printing method, a depositing method, an electrodeposition method, a pigment scattering method and the like. Generally, the printing method is used. This method is divided into two types: a positive type and a negative type according to a method of using a resist. In a dyeing layer is used a natural turu-back material such as a gelatin, casein and the like. The gelatin is easily advantageously dyed.

Also, in the LCD technology, the uniformity of the distance between cell gaps is most important. To obtain the uniformity, the surface of the color filter layer is to be formed in the flatness. The good processing technology for this flatness is to be needed.

In the process for dyeing the color filter layer, there are a mask method and a pattern method. The pattern method has a excellent smoothening quality, resulting in an advantageous utilization. When using a positive resist, there follows an unstable isolation.

This LCD is formed by a lower substrate having a thin film transistor TFT of individual switching element, namely a TFT substrate; a upper substrate having the color filter layer, namely a color filter substrate; and a liquid crystal sealed in the small space formed between the upper and lower substrates.

The manufacturing method of a conventional color filter having the color filer layer will be described as follows.

After cutting, polishing and annealing the upper glass substrate 1, chromium is applied to a thickness of 1000 to 2000 angstroms and patterned to define a plurality of cells. A plurality of black matrixes 2 for blocking light are thereby formed on the upper glass substrate to prevent degradation of thin film transistors.

A material in which pigment is scattered to optimize red spectroscopic characteristics, e.g., a colored acrylic photosensitive resin layer, is applied on the surface of the upper glass substrate with black matrix. It is soft-baked in a hot plate, and then exposed to ultraviolet rays. The colored acrylic photosensitive resin layer is developed by a developer for two to three minutes, and then rinsed by deionized water for 90 second, thereby forming a first color filter layer 3 with optimized red spectroscopic characteristics.

In the same manner as the first color filter layer, a second color filter layer of a colored acrylic photosensitive resin layer having optimized green spectroscopic characteristic is formed on the upper glass substrate, separated from the first color filter layer.

Subsequently, a third color filter layer 5 of a colored acrylic photosensitive resin layer having optimized blue spectroscopic characteristics is formed on the upper glass substrate, separated from the second color filter layer.

In order to protect the black matrix and color filter layers from external impact, a transparent resin layer made of polyimide, polyacrylate, or polyurethane having high surface solidity and excellent photo-transmitivity is formed to a thickness of 0.5 $\mu$m–3 $\mu$m, then soft-baked for five minutes in a hot plate between 150° C.–220° C., thereby forming a protective film 6. The formation of the upper substrate is completed by forming a transparent electrode layer 7 of indium tin oxide, to which voltage for liquid crystal driving is applied, on the protective film to a thickness of 500–1300 angstroms.

In the meantime, the color filter layer comprises the black matrix formed on the upper glass substrate I for preventing degradation of the transistor; a plurality of color filter layers having red, green and blue dyes 3, 4 and 5 sequentially interspersed among the black matrix 2; the protective film 6 formed on the black matrix 2 and the color filter layer 3, 4 and 5;and the transparent electrode layer of ITO formed on the protective film.

In the color filter of the above method, the ITO is deposited on the transparent electrode at a low temperature, so that, at the time of repairing the ITO layer, ITO lines are easily cut off even by slight scratch, resulting in high poor productivity. Also, the low density of the ITO causes the resistance and the adhesive strength to the other deposited materials, for example, protective films of resin to be low and bad, resulting in a broken film and a line short. In addition, the ITO electrode is not well distinguished by human eyes or a charge coupled device CCD camera, so that it is difficult to mount the element exactly at the following step of a tape automated bonding drive integrated circuit.

SUMMARY OF THE INVENTION

An object of the present invention is to provide a color filter substrate for a liquid crystal display such that an indium tin oxide pattern terminal is also formed at the same time when a plurality of black matrixes are formed by the use of chromium, improving the adhesive strength of the indium tin oxide transparent electrode and the productivity can be improved at the time of mounting a tape automated bonding drive integrated circuit.

To achieve the above object, a color filter substrate for a liquid crystal display having upper and lower substrate and a liquid crystal therebetween comprises; a plurality of black matrixes formed at a predetermined interval on a glass substrate; pattern terminals formed at the same height as those of the black matrixes on both end of the substrate; a plurality of color filter layers having red, green and blue dyes sequentially disposed between the black matrix and the pattern terminal, and the black matrix; a protective film formed on the black matrix, the color filter layers, and a part of each pattern terminal; and a transparent electrode layer formed on the protective film, and also formed on each part of said pattern terminal extending from the protective film and so each part of the pattern terminal can be exposed.

The indium tin oxide pattern terminal is also formed with the same material at the same time when the black matrix is formed by the use of chromium in accordance with the preferred embodiment of the present invention, improving the adhesive strength of the indium tin oxide transparent electrode and the pattern terminal, so that a breakage of the indium tin oxide transparent electrode formed on a protective film of resin can be prevented, resulting in improving the productivity.

BRIEF DESCRIPTION OF THE DRAWINGS

Further objects and other advantages of the present invention will be apparent from the following description in connection with the accompanying drawings, wherein.

DESCRIPTION OF THE PREFERRED EMBODIMENT

Figure 1:
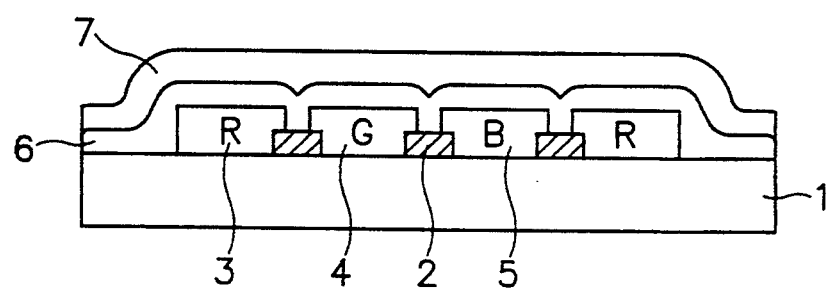
FIG. 1 is a sectional view of a conventional liquid crystal display element.
Figure 2:
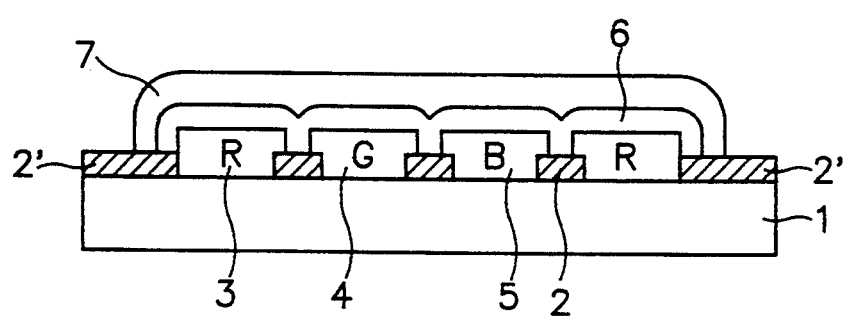
FIG. 2 is a sectional view of a liquid crystal display element of the present invention.

FIG. 2 is a sectional view of a color filter substrate for a liquid crystal display in accordance with the preferred embodiment of the present invention. Referring to FIG. 2, the color filter substrate for a liquid crystal display comprises a plurality of black matrixes 2 formed at a predetermined interval on a upper glass substrate 1 for preventing degradation of a transistor; pattern terminals 2' formed at the same height as that of the black matrixes 2 on both end of the substrate 1; a plurality of color filter layers having red, green and blue dyes 3, 4, and 5 sequentially, separately disposed between the black matrixes 2 and the pattern terminals 2, and overlapped with the black matrixes 2; a protective film 6 formed on the black matrix, the color filter layers and a part of each pattern terminal; and a transparent electrode film 7, for example, of an indium tin oxide formed on the entire protective film.

At that time, the black matrixes 2 and the pattern terminal 2' are formed by the use of black chromium having a high conductivity. The protective film 6 and the ITO transparent electrode film 7 are deposited to be overlapped on a part of each pattern terminal 2'.

Namely, since the adhesive strength of the ITO transparent electrode film 7 and the chromium becomes good, the breakage of the ITO transparent electrode film 7 can be prevented. In addition, the adhesive strength and the conductivity to other deposited materials of the pattern thermal 2' made of the chromium are superior to those of the pattern terminal made of the indium tin oxide.

On the other hand, the other part of each pattern terminal 2' is exposed and a tape automated bonding drive integrated circuit (not shown) is mounted on each exposed pattern terminal 2' with the good adhesive strength at the following process step.

Accordingly, the present invention can overcome the breakage of the transparent electrode film and the protective film, and the bad adhesive strength on the pattern terminal. Also, as the pattern terminal is formed by the use of the black chromium, the tape automated bonding drive integrated circuit can be easily distinguished at the following process step of mounting it, making the automation of process possible and improving the productivity.

Although the preferred embodiments of this invention has been described in detail hereinafter, it should be clearly understood that many variations or modifications of the basic inventive concepts here taught will still fall within the spirit and scope of the present invention, as defined in the appended claims.

What is claimed is:

1. A color filter substrate for a liquid crystal display having upper and lower substrate and a liquid crystal therebetween, comprising;
   (a) a plurality of black matrixes formed at a predetermined interval on a glass substrate;
   (b) pattern terminals formed at the same height as those of the black matrixes on both end of the substrate;
   (c) a plurality of color filter layers having red, green and blue dyes sequentially disposed between the black matrix and the pattern terminal, and the black matrix;
   (d) a protective film formed on the black matrix, the color filter layers, and a part of each pattern terminal;and
   (e) a transparent electrode layer formed on the protective film, and also formed on each part of said pattern terminal extending from the protective film and so each part of the pattern terminal can be exposed.

2. The color filter substrate for a liquid crystal display as claimed in claim 1, wherein the black matrix and the pattern terminals comprises chromium.

* * * * *